July 28, 1942.  R. L. CAWOOD ET AL  2,291,530
MACHINE AND METHOD FOR MANUFACTURING PORCELAIN BALLS
Filed March 13, 1940  10 Sheets-Sheet 1

July 28, 1942.    R. L. CAWOOD ET AL    2,291,530
MACHINE AND METHOD FOR MANUFACTURING PORCELAIN BALLS
Filed March 13, 1940    10 Sheets-Sheet 2

Fig. 7a

Richard L. Cawood
Bertram H. Bucher
David C. Zimmer    Inventors
By Vernon E. Hodges & H. Hamlin Hodges
their Attorneys July 28, 1942.  R. L. CAWOOD ET AL  2,291,530
MACHINE AND METHOD FOR MANUFACTURING PORCELAIN BALLS
Filed March 13, 1940  10 Sheets-Sheet 8

Inventors
Richard L. Cawood
Bertram H. Bucher
David C. Zimmer
By Vernon E. Hodges & H. Hamlin Hodges
their Attorneys

July 28, 1942.   R. L. CAWOOD ET AL   2,291,530
MACHINE AND METHOD FOR MANUFACTURING PORCELAIN BALLS
Filed March 13, 1940   10 Sheets-Sheet 9

Inventors
Richard L. Cawood
Bertram H. Bucher
David C. Zimmer
Vernon E. Hodges
By H. Hamlin Hodges
their Attorneys July 28, 1942.  R. L. CAWOOD ET AL  2,291,530
MACHINE AND METHOD FOR MANUFACTURING PORCELAIN BALLS
Filed March 13, 1940   10 Sheets-Sheet 10

Inventors
Richard L. Cawood
Bertram H. Bucher
David C. Zimmer
By Vernon E. Hodges & H. Hamlin Hodges
their Attorneys Patented July 28, 1942

2,291,530

UNITED STATES PATENT OFFICE 2,291,530

MACHINE AND METHOD FOR MANUFACTURING PORCELAIN BALLS

Richard L. Cawood, East Liverpool, Ohio, and Bertram H. Bucher, Beaver, Pa., and David C. Zimmer, East Liverpool, Ohio, assignors to The Patterson Foundry & Machine Co., East Liverpool, Ohio, a corporation of Ohio Application March 13, 1940, Serial No. 323,818

13 Claims. (Cl. 25—5)

Our invention relates to an improvement in a machine and method for manufacturing porcelain balls.

These balls are made from rather hard clay which is extruded from a pug-mill, and then partially dried before forming.

The raw materials are prepared in the usual manner, and the synthetic body so prepared is extruded by the pug-mill in about the consistency of semi-hard putty in round streams which are adapted to be cut off into substantially forty-inch lengths, after which they are partially dried and are then cut with a piano wire or the like into short cylindrical slugs of a length suitable for formation into balls. Thus far, the present process is conventional.

Our invention consists of a machine and process for forming these slugs into balls. In one form of our invention, the initial step consists in placing the slug or slugs on an endless conveyor which conveys them to an automatic trimmer which first bevels the ends of the slug or slugs so that they will fit into a chuck, after which they are removed by hand from this part of the mechanism, and individually placed on a revolving spindle where one end of the slug is machined to a spherical radius, after which the slug is removed from the spindle, inverted and placed on another spindle where the other end is turned to a spherical radius, all of which operations are a part of the same machine, the vacuum chuck holding the balls in place during the turning operations.

On balls of certain diameters and made of certain materials, the slug bevel operation may be eliminated, the complete beveling and turning operation being performed on the two spindles, one end being completed upon the first spindle, and the other on the second spindle, into either a vacuum or a mechanical chuck, after which they are removed from this part of the mechanism and fed to a revolving spindle where one end of the slug is machined to a spherical radius, being afterwards removed from the spindle, inverted and fed to another spindle where the other end is turned to a spherical radius; all of which operations are part of the same machine, the chuck holding the balls in place during the turning operations.

On balls of certain diameters and made of certain materials, the slug beveling operation may be eliminated, the complete beveling and turning operations being performed either on the two spindles, one end being completed upon the first spindle, and the other end on the second spindle, or both ends being completed, by the use of suitable tools, on the one spindle.

We may use either a mechanical clutching, holding or chucking device, during either the beveling or turning operation or both; we may use either a mechanical clutching, holding or chucking device, or a vacuum holding or chucking device, for holding the balls in place.

In the accompanying drawings:

Fig. 1a is an enlarged partial front elevation;
Fig. 1b is a section on line 1b—1b of Fig. 1a;
Fig. 14a is an enlarged section on line 14a—14a of Fig. 1a.

Where two turning spindles are employed for two turning operations, they are just alike, hence one only need be described.

Figures 1, 23, 24:
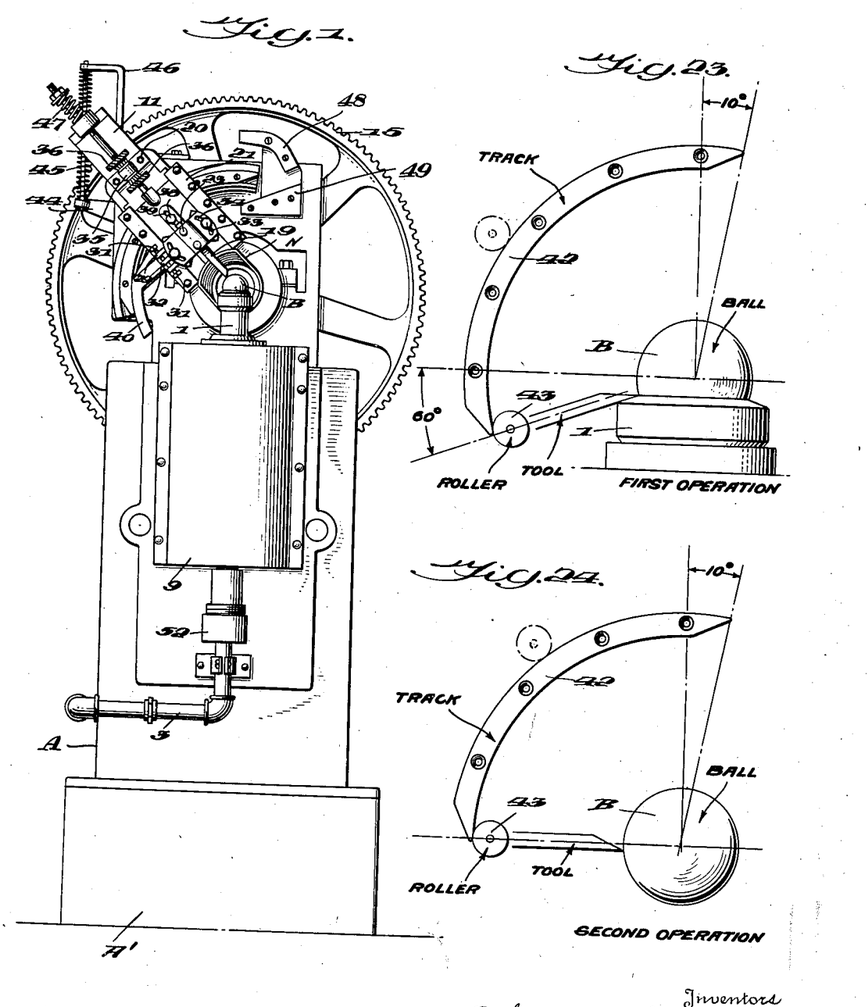
Fig. 1 is a view in front elevation.
Figs. 23 and 24 show roller track for first and second operations.
Figure 2:
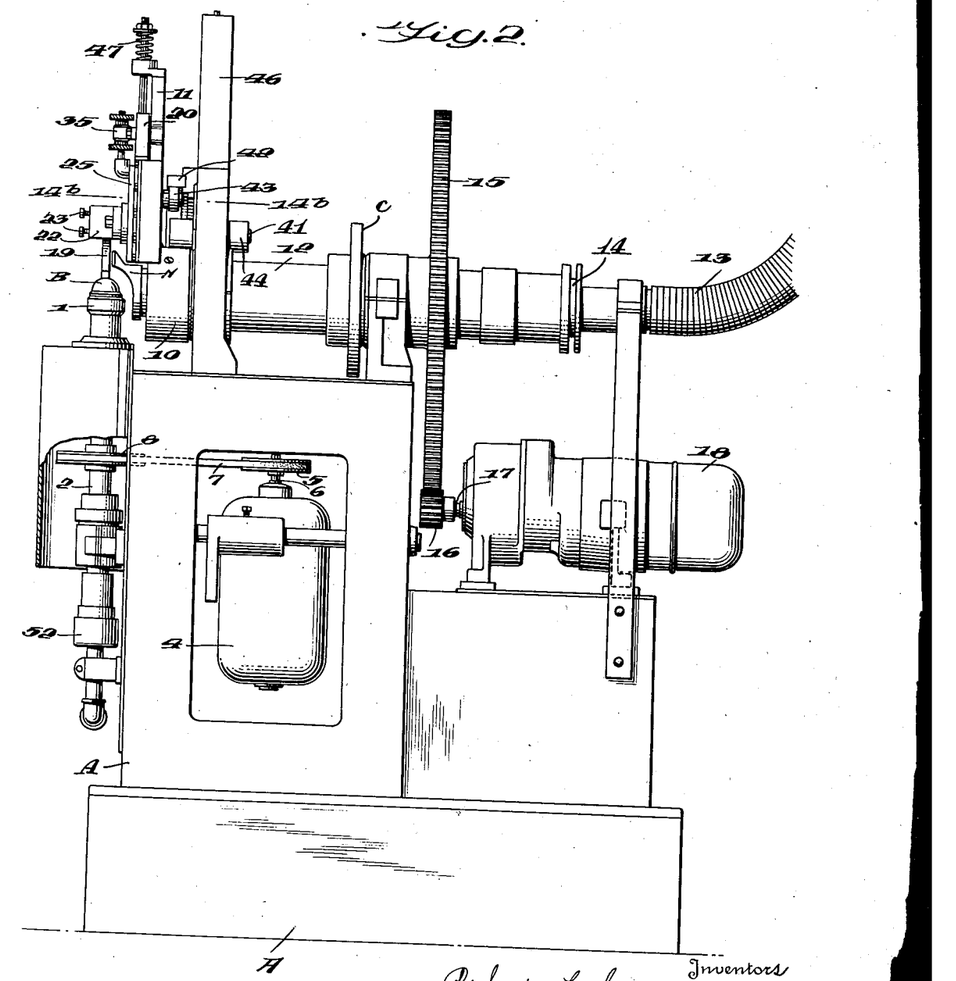
Fig. 2 is a view in side elevation.
Figures 3, 25, 26:
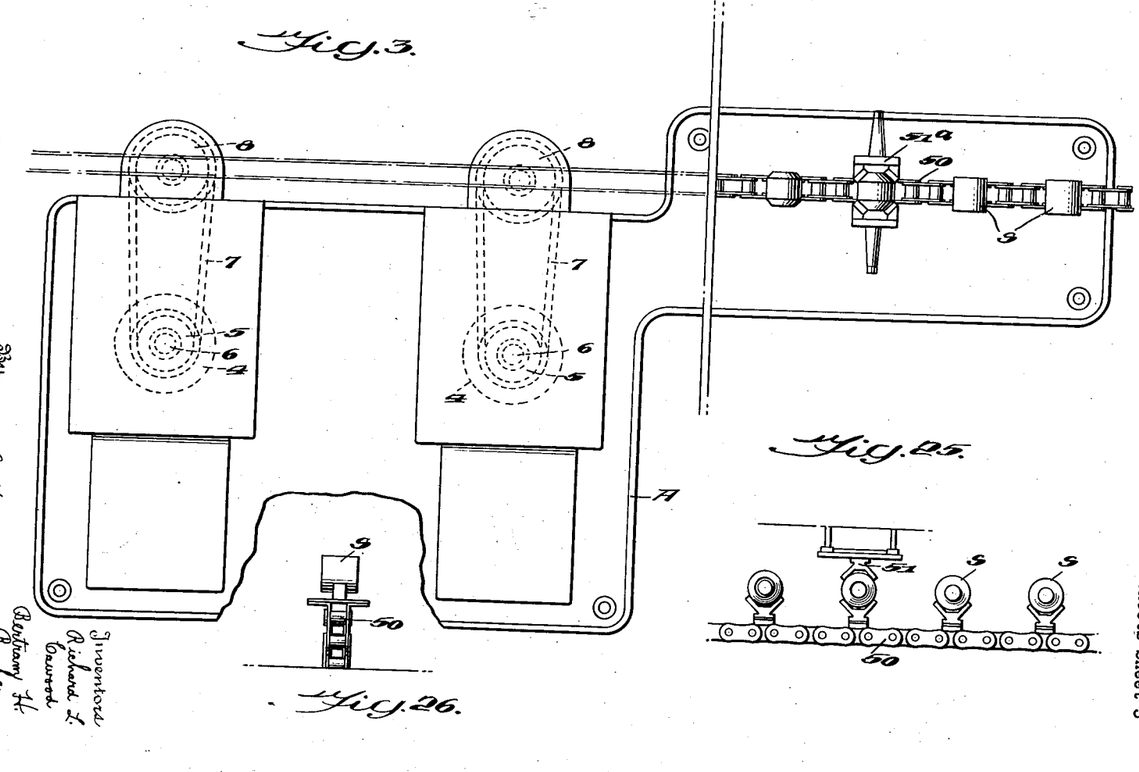
Fig. 3 is a diagrammatic plan view.
Fig. 25 is a diagrammatic view showing a ball feeding mechanism.
Fig. 26 is an end elevation of the same.
Figure 4:
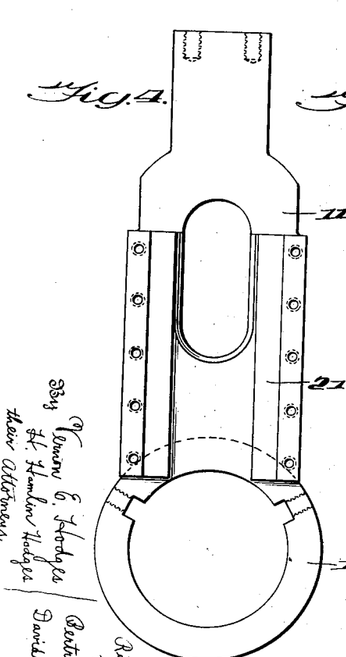
Fig. 4 is an enlarged front view of the swing arm.
Figures 5, 6, 7, 8:
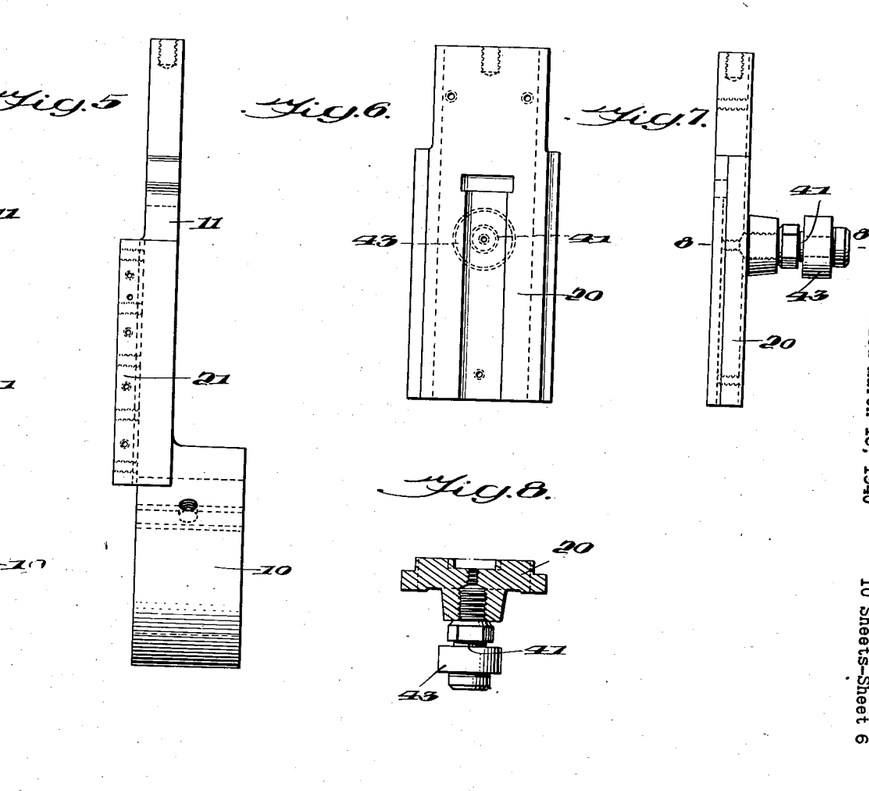
Fig. 5 is a side view of same.
Fig. 6 is a front view of the slide-block.
Fig. 7 is a side view of the slide-block.
Fig. 8 is a cross-section through the line 8—8 of Fig. 7.
Figure 7A:
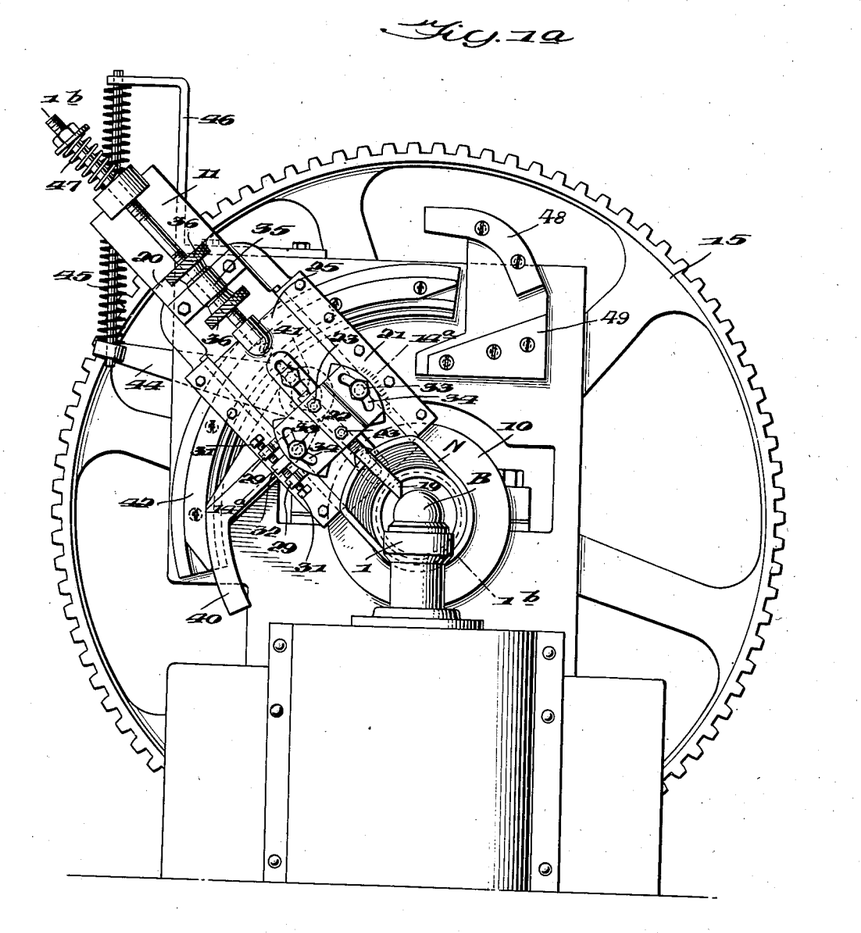

A, represents the main housing structure erected on the base A' shown in Figs. 1, 1b and 2, and giving the general shape and plan in Fig. 3. The purpose is to employ two spindles, side by side, capable of being attended by one operator standing in front of, and between, the two spindles.

The numeral 1 indicates a chuck protruding at the upper end of the hollow vertical shafts 2, each connected to a vacuum pipe 3 at the bottom. These shafts are driven by two vertically placed motors 4, each having a drive pulley 5 on the upper end of its shaft 6, and this motion is transmitted by V-belts 7 to the larger pulleys 8 keyed on the hollow shafts 2. The guard 9 is placed over this rotating mechanism.

The hub 10 of the oscillating swing arm 11 is keyed to the horizontally disposed hollow shaft 12. To the outer end of this hollow shaft 12 a suction hose 13 extends to a suction system (not shown). A stuffing-box 14 provides for the rotation of this shaft 12 with respect to the suction hose. On this hollow shaft, a large gear-wheel 15 is keyed, and this is driven back and forth by a pinion 16 on the shaft 17 of the reversing motor 18, all of which is shown in Fig. 2.

C is a cam, mounted on the hollow shaft 12, for operating electric switches (not shown) which latter automatically reverse the reversing motor 18, and with it the swing arm 11 also carried by the hollow shaft 12.

Turning to the forward or left-hand end of the hollow shaft 12, the adjusting means for the cutting tool 19 is all carried by the oscillating swing arm 11. A slide block 20 is movable in and out through the housing 21 on the swing arm 11.

Figures 9, 10:
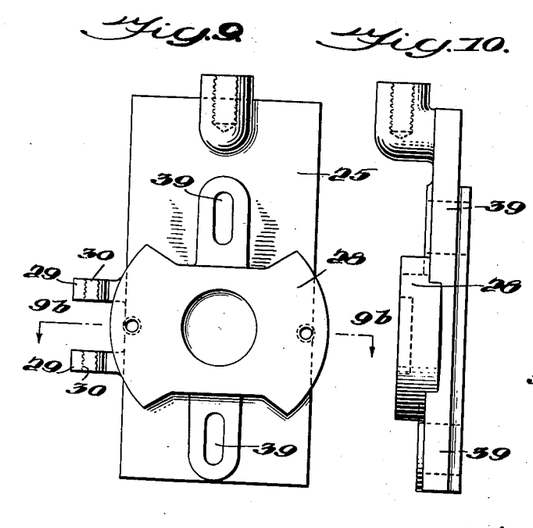
Fig. 9 is a detail view of the adjustable tool support.
Fig. 10 is a side view of the tool support.
Figure 9A:
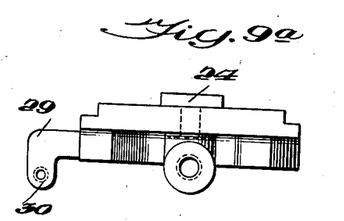
Fig. 9a is an end view of the same.
Figure 9B:
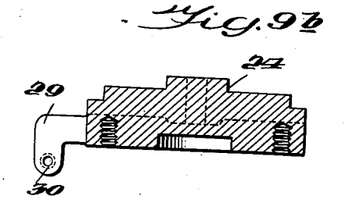
Fig. 9b is a section on line 9b—9b of Fig. 9.
Figure 14:
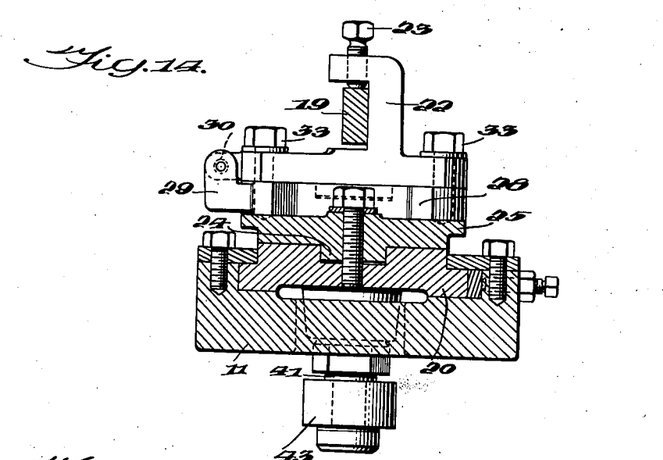
Fig. 14 is an enlarged sectional view showing the adjustable tool-holder with parts (including the tool) in cross-section.
Figure 14A:
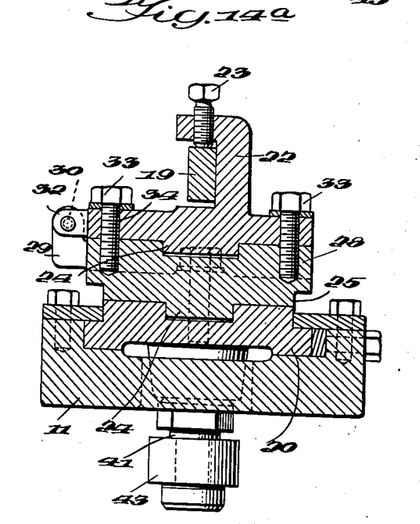
Figure 14B:
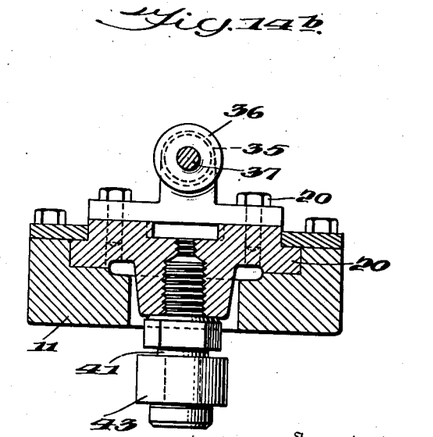
Fig. 14b is an enlarged section on the line 14b—14b of Fig. 1b.
Figures 15, 16:
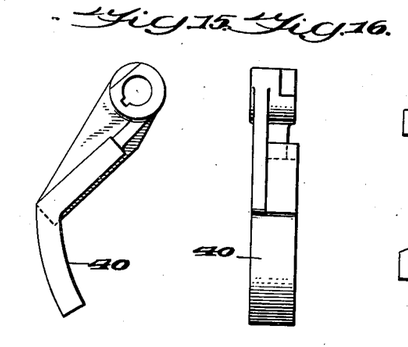
Fig. 15 is a view of the switch or latch.
Fig. 16 is a view of the same taken at right angles.
Figure 17:
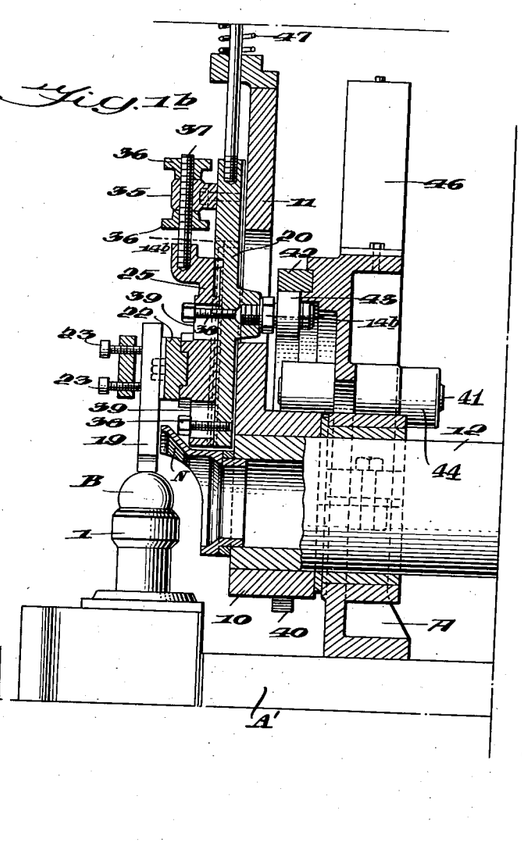
Fig. 17 is a view looking into the dust-catcher.
Figure 18:
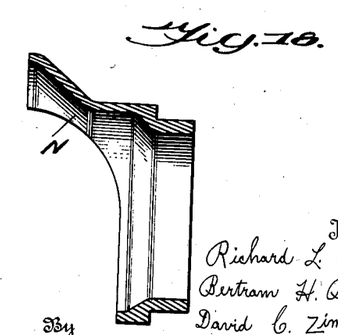
Fig. 18 is a section through the same on line 18—18 of Fig. 17.
Figure 19:
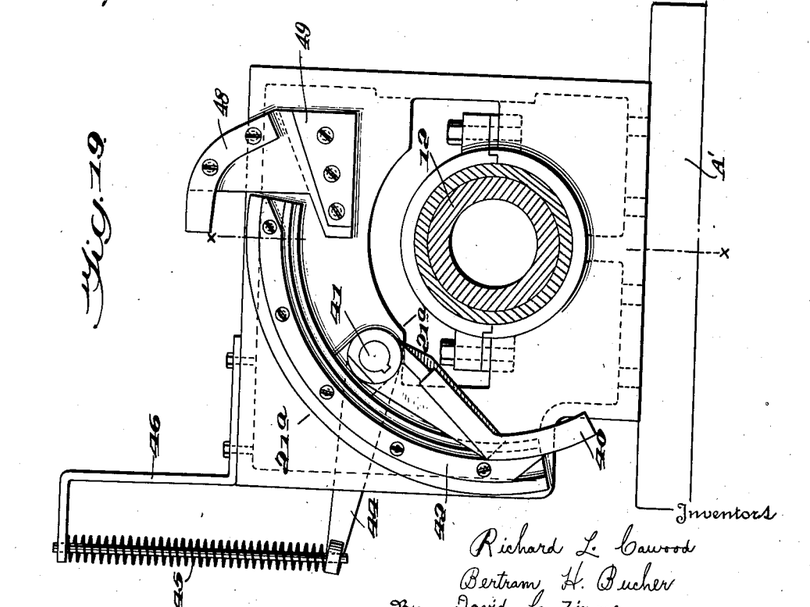
Fig. 19 is a view of the head bearing structure showing the track.
Figure 20:
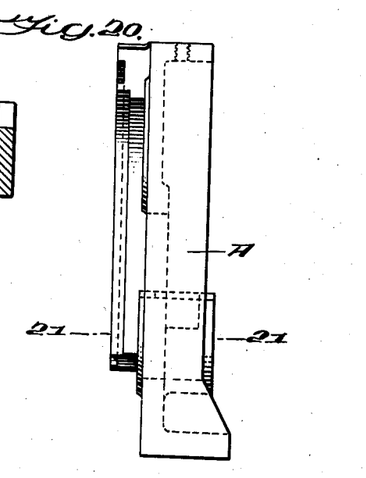
Fig. 20 is a view in side elevation of a portion of the frame.
Figure 21:
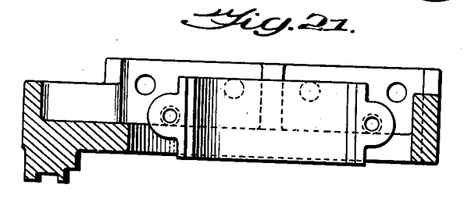
Fig. 21 is an enlarged section on line 21—21 of Fig. 20.
Figure 21A:
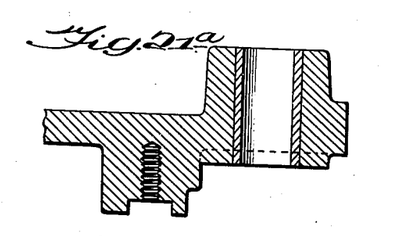
Fig. 21a is an enlarged section on the line 21a—21a of Fig. 19.

On the slide block 20, the adjustable tool holder 22 is mounted. The tool 19 is held in the tool-holder 22 by set-screws 23, see Figs. 1, 2 and 14. The tool-holder 22 has a hub 24, which is capable of turning in the hole 27, (see Fig. 10) in the adjustable tool holder support 28. The tool holder 22 is supported on an adjustable base plate 25.

Figure 11:
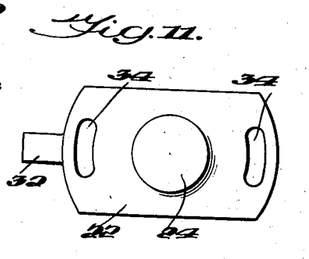
Figs. 11, 12 and 13 are details of the adjustable tool-holder.
Figure 12:
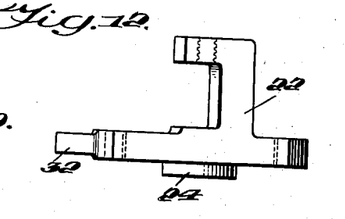
Figure 13:
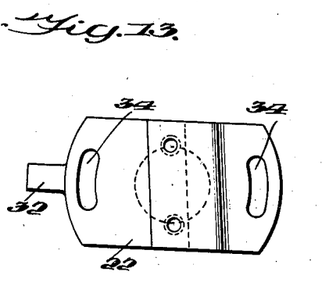

The tool holder support 28 is provided with lugs 29 having threaded holes 30 therein, and set-screws 31 are adapted to be turned in these holes and engage the projection 32 on the tool-holder extending between these two lugs 29, thus providing a means for axially adjusting the tool holder and bringing the tool to the required angle in order to swing the tool sidewise so as to locate the point of the tool at the center of the ball B. Loosening and adjustment of the screws 33 is made through the arcuate slots 34 in the tool-holder shown in dotted lines in Fig. 1, and in full lines in Figs. 11, 12 and 13. A base plate 25 has sliding adjustable connection with the slide block 20, and it has a micrometer adjustment 35 (see Figs. 1b and 2), the nuts 36 of which turn on the threaded screw 37 (see Figs. 1, 2, 9 and 10). Studs 38 extending through the slots 39 hold the tool support 25 in adjusted position.

Figure 22:
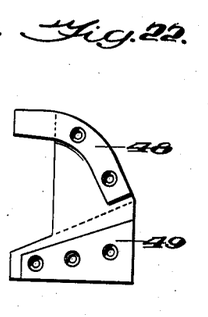
Fig. 22 is a diagrammatic view showing the top and bottom guide.
Figure 22A:
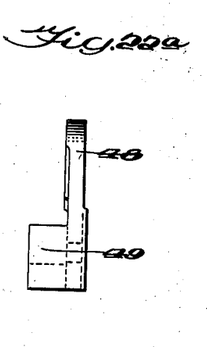
Fig. 22a is a view at right-angles to the same.

The swing arm 11 carried by the shaft 12 is oscillated automatically by the reversing motor through the pinion 16 and large gear 15 (see Fig. 2) to slide the tool 19 alternately in and out, and this is controlled by the following mechanism:

A switch or latch 40 (see Figs. 1, 1a, 15 and 16) mounted on a shaft 41 normally rests against the curved track 42 and a roller 43 on the back of the slide 20 (see Figs. 1b, 2, 7, 8, 14, 14a, 14b, 23 and 24) follows the outer and lower edges of this curved track. The shaft 41 has a lever arm 44 attached thereto, and a spring 45 extends upwardly from the outer end of this lever arm 44 to a support 46 (see Figs. 1, 1a and 2). When the roller 43 passes over the top of the track 42, a spring 45 is put in tension and tends to throw the slide 20 outward so that the roller 43 will return over the outside of the track. A stiff spring 47 at the outer end of the swing arm 11 (see Figs. 1 and 2) is under compression while the roller 43 is on the inside of the track 42, thereby holding the slide firm while the ball B is being turned. The top guide 48 (see Fig. 22) and the bottom guide 49 are simply guides to transfer the roller 43 from the top of the track to the bottom thereof. Of course, the reversing motor is timed to satisfy these guides. The bottom guide 49 is preferably made of firm rubber in order to eliminate shock.

To repeat, in operation this roller 43 travels around the upper right-hand end or tip of the track 42, thence down against the inside radius of this track from right to left, and upon arrival at the left-hand end of the track, throws the trip 40 to the right, and then when the roller has cleared the track the trip flies back, throwing the roller to the left, and it then returns on the outer radius of the track from the extreme left-hand end of this track to the extreme right-hand end where it rolls over the right-hand tip end of the track ready for its return trip on the inside radius of the track. The ball B is turned during the interval of travel of this roller 43, from the right to the left-hand side of the track on the inside radius, the return on the outside radius from the left to the right acting to pull the tool 19 away from the ball B so that the operator has an opportunity to remove the ball from the vacuum cup and the tool 19 returning, at the same time, to its topmost position ready for the next stroke.

Figure 28:
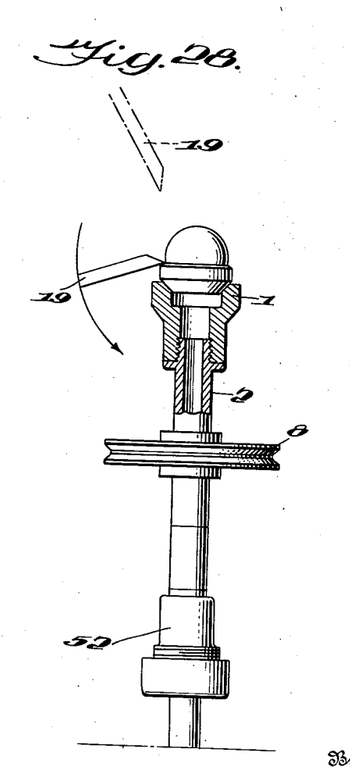
Figure 30:
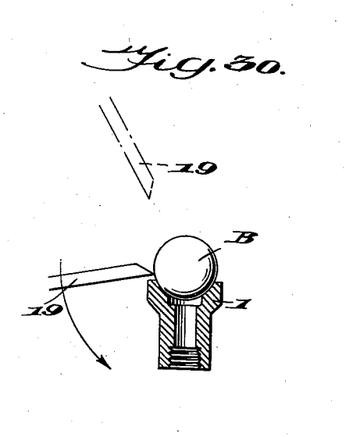

The track 42 is shown in two different sizes in Figs. 23 and 24, the longer track being used in connection with the first turning attachment or operation, it being longer because it is necessary to have greater travel for the tool, allowing the tool to drop below the center line of the ball, so as to turn more than half of the ball at the first operation, as shown in Figs. 2, 28, and 30; but the track shown in Fig. 24 for the second turning operation on the second machine is made shorter because in this case the tool need only travel a sufficient distance to turn one-half of the ball.

A suction nozzle N is arranged in proximity to the ball chuck and communicates with the hollow shaft 12, whereby to convey the material cut from the ball to the suction collector system as shown at the right in Fig. 2.

In carrying out our present method, and as it is generally followed, the slugs S (as shown in Figs. 3 and 25) is more or less cylindrical form are fed on the intermittently operating conveyor 50. In connection and timed with this conveyor 50, there is a clamping device 51, see Fig. 25, which holds the slug at a definite point while opposite ends of the slug are being beveled as better shown at the right in Fig. 3, the beveling tool 51 being intermittently timed to synchronize with the movement of the conveyor. The prime reason for beveling these slugs is to produce a true sealing face on the ends of the slugs as hereinafter described, and also to remove a portion of the surplus material in order to relieve the next operation.

Figure 27:
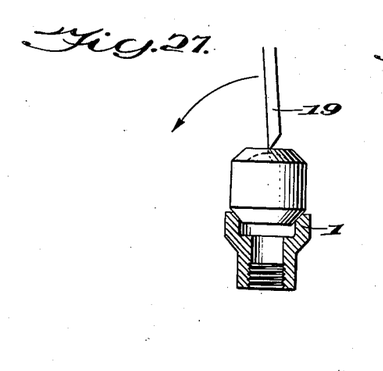
Figs. 27 to 30 show the turning operations for completing the ball.
Figure 29:
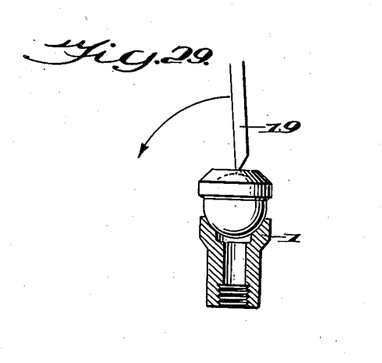

From the beveling machine, the slugs are delivered to the first turning operation, the slugs being held by means of a beveled vacuum chuck 1 (see Figs. 1, 1a, 1b, 2, 27, 28, 30 and 31). The first half of the ball is being formed (as shown in Figs. 27 and 29) by the tool 19, which has previously been set at the proper angle as heretofore described, first as shown in Fig. 27, and turning to the position shown in full lines in Fig. 28. This finishes the first half of the formation of the ball. The slug is then reversed and placed in the spherical vacuum clutch (shown in Fig. 29) and the tool is set as indicated therein in the second machine ready for the second turning operation. It should be mentioned that the two turning operations are so synchronized as to make the operation continuous.

In Fig. 30, the ball B is shown in its finished form. Vacuum is in contact with the vacuum chucks 1 through the hollow spindles 2. To the lower end of these spindles are attached rotary stuffing boxes 52 (see Figs. 1, 2 and 28). Vacuum is intermittently controlled by means of an electrically operated valve in the vacuum line (not shown).

As has been previously described, the cutting tool is carried on a swing arm attached to a horizontal hollow shaft 12, which is in turn operated by a reversing motor 18. The cuttings from the turning tool are drawn through this hollow shaft by the connecting suction line 13. The sliding tool head has a revolving ball bearing which acts as a roller, and which contacts the inside of the circular track 42 while turning the ball. At the end of the stroke, this roller contacts a switch which throws the slide outward, the roller then following the outside of the circular track, thus completing the cycle.

As previously stated, we do not wish to be confined to the use of the vacuum for holding the balls in place during the turning operation, as we expect to use some mechanical or holding device as well as, or instead of, the vacuum in some instances. Also on balls of certain size and made of certain material, the primary trimming operation will not be necessary.

The operator stands in front and midway between the two machines where he can manipulate the balls and place them in the chucks. The machine itself is entirely automatic, and the method is continuous.

We claim:

1. The combination of a machine frame, means for holding an object to be fashioned into a ball, a rotatable hollow shaft, a swing arm connected therewith, a cutting tool, means carried by the swing arm for the support of the cutting tool, a reversing motor, gears for transmitting reversing motion from said motor to the hollow shaft and thence to the swing arm, a slide connected with the swing arm, a switch connected with the arm, a curved track on the frame of the machine and means extending from the swing arm to the slide for moving the latter to hold the slide in contact with one side of the track.

2. The combination of a machine frame, means for holding an object to be fashioned into a ball, a rotatable hollow shaft, a swing arm connected therewith, a cutting tool, means carried by the swing arm for the support of the cutting tool, a reversing motor, gears for transmitting reversing motion from said motor to the hollow shaft and thence to the swing arm, a slide connected with the swing arm, a switch connected with the arm, a curved track on the frame of the machine, means extending from the swing arm to the slide for moving the latter to hold the slide in contact with one side of the track, a lever mechanism, roller and spring tension for confining the position of the slide to the opposite side of the track.

3. In a machine of the character described, the combination of a hollow rotary shaft, means for automatically reversing the latter at predetermined intervals, a swing arm carried by the shaft, a slide slidably connected with the arm, a tool support adjustable on the slide, a tool holder carried by the support, a cutting tool held by the tool-holder, means for adjusting the tool support with respect to the slide, and means for adjusting the tool in the holder.

4. The combination of means for holding the device to be formed, a rotary shaft, reversing means for said shaft, a swing arm carried by the shaft, a slide movably connected therewith, a lever, a roller connected with the slide, a track in the path of the roller, means for switching the roller at the end of each stroke from one side of the track to the other, spring tension means for holding the roller alternately in contact with opposite sides of the track, whereby to hold the slide in its predetermined position, a tool holder carried by the slide, and a cutting tool held by the tool holder.

5. The combination of means for holding an object to be formed, a rotary shaft, reversing means for said shaft, a swing arm carried by the shaft, a slide movably connected therewith, a lever, a roller connected with the slide, a track in the path of the roller, means for switching the roller at the end of each stroke from one side of the track to the other, spring tension means for holding the roller alternately in contact with opposite sides of the track, whereby to hold the slide in its predetermined position, a tool holder carried by the slide, a cutting tool held by the tool holder, and separate means for adjusting the tool holder and the tool.

6. An improved method of forming plastic balls which consists in feeding slugs to a timed and intermittently operating beveling device, then placing the slugs in a machine so that a beveled ends is exposed, moving a cutting tool in contact with the exposed end, whereby to give it a semispherical shape, thereafter inverting the slug and similarly fashioning the remaining portion, and automatically moving the cutting tool alternately in and out of contact with the device being fashioned.

7. The combination of a suitable frame, means for holding an object to be formed, a rotary shaft, reversing means for said shaft, a swing arm carried by the shaft, a slide movably connected with the arm, a lever, a roller carried by slide, a track on the frame of the machine in the path of the roller, means for switching the roller at the end of each stroke from one side of the track to the other, and a tool holder carried by the slide.

8. An automatic machine for manufacturing balls including means for holding and revolving a slug from which a ball is to be formed, a shaft which turns on an axis extending approximately through the center of the slug, a swing arm, a cutting tool carried by the arm in position to engage the slug with the movement of the arm, means for swinging the arm alternately in opposite directions, means for automatically moving the cutting tool alternately in and out of contact with the device being fashioned, said last-named means characterized by a curved track, means to travel thereon, and means for automatically shifting said means from one edge of the track to the other.

9. The combination of a shaft, means for alternatly turning the latter in opposite directions, a swing arm secured to the shaft, a slide block slidably connected with the swing arm, an anti-friction roller carried by the slide block, a track against which the roller turns, and means for switching the roller to opposite sides of the track with the different strokes of the swing arm.

10. The combination of a hollow shaft, means for creating suction therein whereby to remove cutting through the hollow shaft a nozzle connected to one end of the shaft, rotary means for holding a slug in proximity to the nozzle, a swing arm secured to the shaft, and means connected with the swing arm for holding a tool in contact with the slug as the shaft is turned, whereby the slug is fashioned into shape, and automatic means for alternately turning the shaft in opposite directions.

11. In a machine of the character described, the combination of a reversible shaft, means for automatically reversing the latter, rotary means for holding the work to be fashioned, a swing arm carried by the shaft in proximity to the means for holding the work, a slide block slidably connected with the swing arm, a shaft with which the slide block is connected, a curved track, an anti-friction roller on said last-named shaft which travels on the track, means for switching this roller from one side of the track to the other, means for holding the roller in close contact with said track, and a tool carried by the swing arm in position to contact the work and swing across its axis of rotation.

12. In a machine of the character described, the combination of a reversible shaft, means for automatically reversing the latter, rotary means for holding the work to be fashioned, a swing arm carried by the shaft in proximity to the means for holding the work, a slide block slidably connected with the swing arm, a shaft with which the slide block is connected, a curved track, an anti-friction roller on said last-named shaft which travels on the track, means for switching this roller from one side of the track to the other, means for holding the roller in close contact with said track, a tool carried by the swing arm in position to contact the work and swing across its axis of rotation, a tool holder carried by the slide block, and endwise and angular adjustments for the tool, the latter being carried by the slide block.

13. In a machine of the character described, the combination of a reversible shaft, means for automatically reversing the latter, rotary means for holding the work to be fashioned, a swing arm carried by the shaft in proximity to the means for holding the work, a slide block slidably connected with the swing arm, a shaft with which the slide block is connected, a curved track, an antifriction roller on said last-named shaft which travels on the track, means for switching this roller from one side of the track to the other, a lever secured to said last-named shaft, a spring extending from said lever to a suitable support, which spring is put in tension and tends to throw the slide outward so that the roller will run over the outside of the track, and a second spring at the outer end of the swing arm which is under compression while the roller is on the inside of the track, thereby holding the slide block firm while the work is being turned.

RICHARD L. CAWOOD.
BERTRAM H. BUCHER.
DAVID C. ZIMMER.